United States Patent
Kim et al.

(10) Patent No.: US 10,440,518 B2
(45) Date of Patent: Oct. 8, 2019

(54) METHOD AND SYSTEM FOR PROVIDING INTEGRATED INDOOR AND OUTDOOR POSITIONING

(71) Applicant: NAVER Business Platform Corporation, Seongnam-si (KR)

(72) Inventors: Daewoong Kim, Seongnam-si (KR); Jungmin Kang, Seongnam-si (KR); Tae Gyu Kang, Seongnam-si (KR); Sechun Oh, Seongnam-si (KR); Ho Jin Lee, Seongnam-si (KR)

(73) Assignee: NAVER Business Platform Corporation, Seongnam-si (KR)

( * ) Notice: Subject to any disclaimer, the term of this patent is extended or adjusted under 35 U.S.C. 154(b) by 18 days.

(21) Appl. No.: 15/934,340

(22) Filed: Mar. 23, 2018

(65) Prior Publication Data

US 2018/0213363 A1 Jul. 26, 2018

Related U.S. Application Data

(63) Continuation of application No. PCT/KR2016/010635, filed on Sep. 23, 2016.

(30) Foreign Application Priority Data

Sep. 25, 2015 (KR) .................. 10-2015-0137008

(51) Int. Cl.
*H04W 4/029* (2018.01)
*G01S 19/42* (2010.01)
(Continued)

(52) U.S. Cl.
CPC ............ *H04W 4/029* (2018.02); *G01S 19/12* (2013.01); *G01S 19/42* (2013.01); *H04W 4/025* (2013.01);
(Continued)

(58) Field of Classification Search
CPC ....... H04W 4/029; H04W 4/33; H04W 4/025; H04W 64/00; G01S 19/12; G01S 19/42; G01C 21/206
See application file for complete search history.

(56) References Cited

U.S. PATENT DOCUMENTS

| | | | | |
|---|---|---|---|---|
| 2010/0317366 | A1* | 12/2010 | Shen | G01S 5/0252 455/456.1 |
| 2013/0065604 | A1* | 3/2013 | Werner | G01S 5/0263 455/456.1 |

(Continued)

FOREIGN PATENT DOCUMENTS

| | | |
|---|---|---|
| JP | 2010107237 A | 5/2010 |
| JP | 2011002427 A | 1/2011 |

(Continued)

OTHER PUBLICATIONS

Japanese Office Action dated Apr. 23, 2019 by the Japanese Patent Office corresponding to Japanese patent application No. 2018-515224.

*Primary Examiner* — Marisol Figueroa
(74) *Attorney, Agent, or Firm* — Greer Burns & Crain, Ltd.

(57) ABSTRACT

A method and a system for providing integrated indoor and outdoor positioning are disclosed. The method for providing integrated positioning may comprise the steps of: receiving, by a user terminal, GPS coordinate information of the user terminal moving in an outdoor area around a building and an outdoor area within the building; and determining, by the user terminal, information on an area in which the user terminal is located and a floor on which the user terminal is located in the building, on the basis of GPS coordinate information mapped to each of the outdoor area around the
(Continued)

building and the outdoor area within the building and the received GPS coordinate information.

20 Claims, 11 Drawing Sheets

(51) Int. Cl.
    *H04W 64/00*     (2009.01)
    *G01C 21/20*     (2006.01)
    *G01S 19/12*     (2010.01)
    *H04W 4/02*     (2018.01)
    *H04W 4/33*     (2018.01)

(52) U.S. Cl.
    CPC ............. *H04W 4/33* (2018.02); *H04W 64/00* (2013.01); *G01C 21/206* (2013.01)

(56) References Cited

U.S. PATENT DOCUMENTS

| | | | |
|---|---|---|---|
| 2014/0171068 A1* | 6/2014 | Marti | G01S 1/047 |
| | | | 455/427 |
| 2015/0309180 A1* | 10/2015 | Jiang | G01S 5/0252 |
| | | | 701/468 |

FOREIGN PATENT DOCUMENTS

| JP | 2013200156 A | 10/2013 |
|---|---|---|
| JP | 2014178170 A | 9/2014 |
| KR | 1020100041540 A | 4/2010 |
| KR | 1020110083223 A | 7/2011 |
| KR | 1020120071291 A | 7/2012 |
| KR | 101269733 B1 | 5/2013 |
| KR | 1020150070263 A | 6/2015 |
| KR | 101549144 B1 | 8/2015 |

* cited by examiner

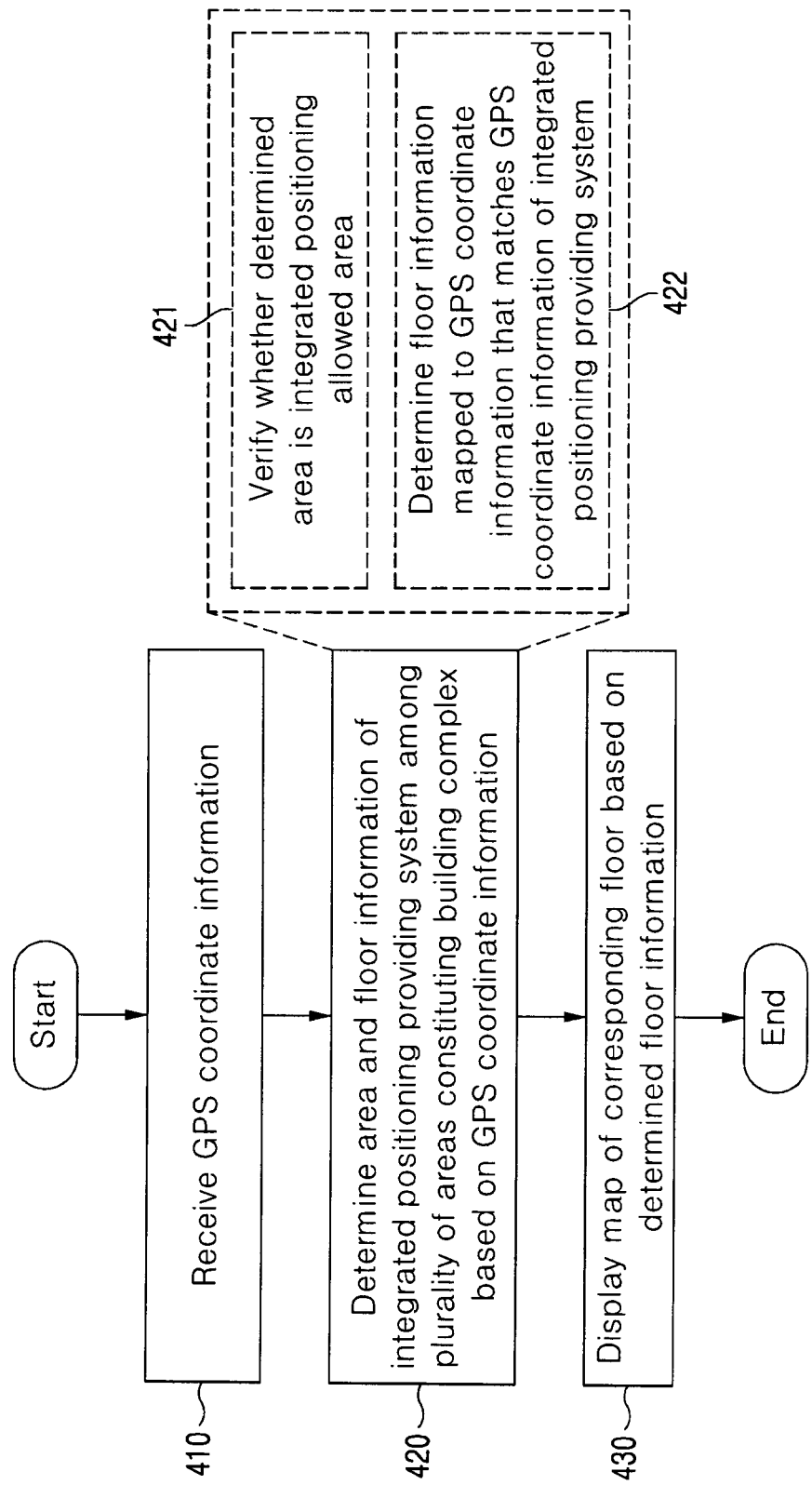

| Area information (501) | Area-by-area coordinate information (502) | Floor information (503) | AP identification information (504) | MAC address of AP (505) | GPS coordinate information of AP (506) | Positioning allowance/ disallowance (507) |
|---|---|---|---|---|---|---|
| Building area A (name or identification number of building A) | | 1F | AP1 | MAC address of AP1 | MAC coordinates of AP1 | Possible |
| | | | AP2 | MAC address of AP2 | MAC coordinates of AP2 | Possible |
| | | 2F | AP3 | MAC address of AP3 | MAC coordinates of AP3 | Possible |
| | | | AP4 | MAC address of AP4 | MAC coordinates of AP4 | Possible |
| | | | AP5 | MAC address of AP5 | MAC coordinates of AP5 | Possible |
| | | 3F | AP6 | MAC address of AP6 | MAC coordinates of AP6 | Possible |
| | | | AP7 | MAC address of AP7 | MAC coordinates of AP7 | Possible |
| | | 4F | AP8 | MAC address of AP8 | MAC coordinates of AP8 | Possible |
| | | | AP9 | MAC address of AP9 | MAC coordinates of AP9 | Possible |
| | GPS coordinate information | 5F | | | | Possible |
| Building area B (name or identification number of building B) | | 1F | AP10 | MAC address of AP10 | MAC coordinates of AP10 | Possible |
| | | | AP11 | MAC address of AP11 | MAC coordinates of AP11 | Possible |
| | | 2F | AP12 | MAC address of AP12 | MAC coordinates of AP12 | Possible |
| | GPS coordinate information | 3F | | | | Possible |
| Area C (1F outdoor area) | GPS coordinate information | 1F | AP13 | MAC address of AP13 | MAC coordinates of AP13 | Possible |
| | | | AP14 | MAC address of AP14 | MAC coordinates of AP14 | Possible |

METHOD AND SYSTEM FOR PROVIDING INTEGRATED INDOOR AND OUTDOOR POSITIONING

CROSS-REFERENCE TO RELATED APPLICATIONS

This is a continuation application of International Application No. PCT/KR2016/010635, filed Sep. 23, 2016, which claims benefit of Korean Patent Application No. 10-2015-0137008, filed Sep. 25, 2015.

BACKGROUND OF THE INVENTION

Field of Invention

Example embodiments of the present invention relate to technology for determining a location of a user terminal that moves within and around a building.

Description of Related Art

With the recent spread of smartphones and developments in mobile communication networks, users may use a variety of information and services without constraints on time and space.

Among services provided to users, a location-based service is applied to a notification of a bus/subway arrival time, navigation, and the like, and provides the users with information suitable for various purposes.

In addition, with the developments in traffic facilities and convenience facilities, subway stations, bus terminals, etc., are connected to complex shopping centers, department stores, etc., in which cinemas, shops, and bookstores are gathered. Accordingly, a size of a building is being enlarged and a user may not readily reach a desired destination without using an indoor map of a building. As demand for nature increases, a social trend is applied to construct a building complex that includes a plurality of buildings. For example, in many cases, an outdoor plaza, an outdoor stage, and an outdoor fountain may be present between buildings and a sky park may be provided on the rooftop of each building. Outdoor plazas and sky parks are outdoor areas within a building complex. Users may freely move inside and outside a building and may also freely move between buildings. Here, in an outdoor area, a ceiling is open and thus, a signal of a wireless access point (AP) located in a building different from a building in which a user terminal is located or a floor different from a floor on which the user terminal is located may be received. Accordingly, it is difficult to measure an accurate location of the user terminal and also difficult to identify a floor on which the user terminal is located from among a plurality of floors using global positioning system (GPS) coordinate information alone. Therefore, there is a need for technology for measuring the location of a user terminal in an indoor area and an outdoor area corresponding to a building complex. For example, an indoor positioning method for verifying an indoor location of a terminal using a GPS satellite signal, an external antenna, and indoor mapping information is disclosed in Korean Patent Publication No. 10-2010-0041540.

BRIEF SUMMARY OF THE INVENTION

One or more example embodiments provide an indoor and outdoor integrated positioning providing method and system that may measure a location of a user terminal in conjunction with an indoor area and an outdoor area of a building using only global positioning system (GPS) coordinate information of the user terminal.

One or more example embodiments also provide an indoor and outdoor integrated positioning providing method and system that may further accurately measure a location of a user terminal and may correct the location of the user terminal by further using wireless access point (AP) information in addition to GPS coordinate information of the user terminal.

According to an aspect of at least one example embodiment, there is provided a method of providing a position of a user terminal, the method including receiving, by a user terminal, global positioning system (GPS) coordinate information of the user terminal that moves in an outdoor area around a building and an outdoor area within the building; and determining, by the user terminal, an area in which the user terminal is located in the building and floor information associated with a floor on which the user terminal is located in the building based on GPS coordinate information mapped to each of the outdoor area around the building and the outdoor area within the building and the received GPS coordinate information.

According to an aspect of at least one example embodiment, there is provided an integrated positioning providing system of a user terminal configured as a computer, the integrated positioning providing system including at least one processor configured to execute computer-readable instructions. The at least one processor includes a reception controller configured to control the user terminal to receive GPS coordinate information of the user terminal that moves in an outdoor area around a building and an outdoor area within the building; and a location determiner configured to control the user terminal to determine an area in which the user terminal is located in the building and floor information associated with a floor on which the user terminal is located in the building based on GPS coordinate information mapped to each of the outdoor area around the building and the outdoor area within the building and the received GPS coordinate information.

According to at least one example embodiment, there is provided a non-transitory computer-readable storage medium including an instruction to control integrated positioning of a user terminal. The instruction includes receiving, by a user terminal, GPS coordinate information of the user terminal that moves in an outdoor area around a building and an outdoor area within the building; and determining, by the user terminal, an area in which the user terminal is located in the building and floor information associated with a floor on which the user terminal is located in the building based on GPS coordinate information mapped to each of the outdoor area around the building and the outdoor area within the building and the received GPS coordinate information.

According to some example embodiments, it is possible to position a building area in which a user terminal is located and a floor of a corresponding building in conjunction with an indoor area and an outdoor area of the building based on global positioning system (GPS) coordinate information alone of the user terminal by using GPS coordinate information mapped to each area constituting the building.

Also, according to some example embodiments, although a user terminal is located at an edge between an outdoor area and an indoor area, it is possible to perform further accurate positioning by correcting a location of the user terminal further using wireless access point (AP) information in addition to GPS coordinate information of the user terminal.

Also, according to some example embodiments, it is possible to provide a positioning service in conjunction with an indoor area and an outdoor area corresponding to a building based on GPS coordinate information of a user terminal and wireless AP information received at the user terminal.

Also, according to some example embodiments, it is possible to determine and provide an area in which a user terminal is located among outdoor areas around or within a building and to determine and provide even a floor on which the user terminal is located in the determined area, for example, a floor on which the user terminal is located in an outdoor area within the building.

BRIEF DESCRIPTION OF THE DRAWINGS

FIG. 4 is a flowchart illustrating an integrated positioning providing method according to one embodiment.

FIG. 5 illustrates an example of integrated positioning information used to determine an area and floor information based on global positioning system (GPS) information according to one embodiment.

DETAILED DESCRIPTION OF THE INVENTION

Figure 1:
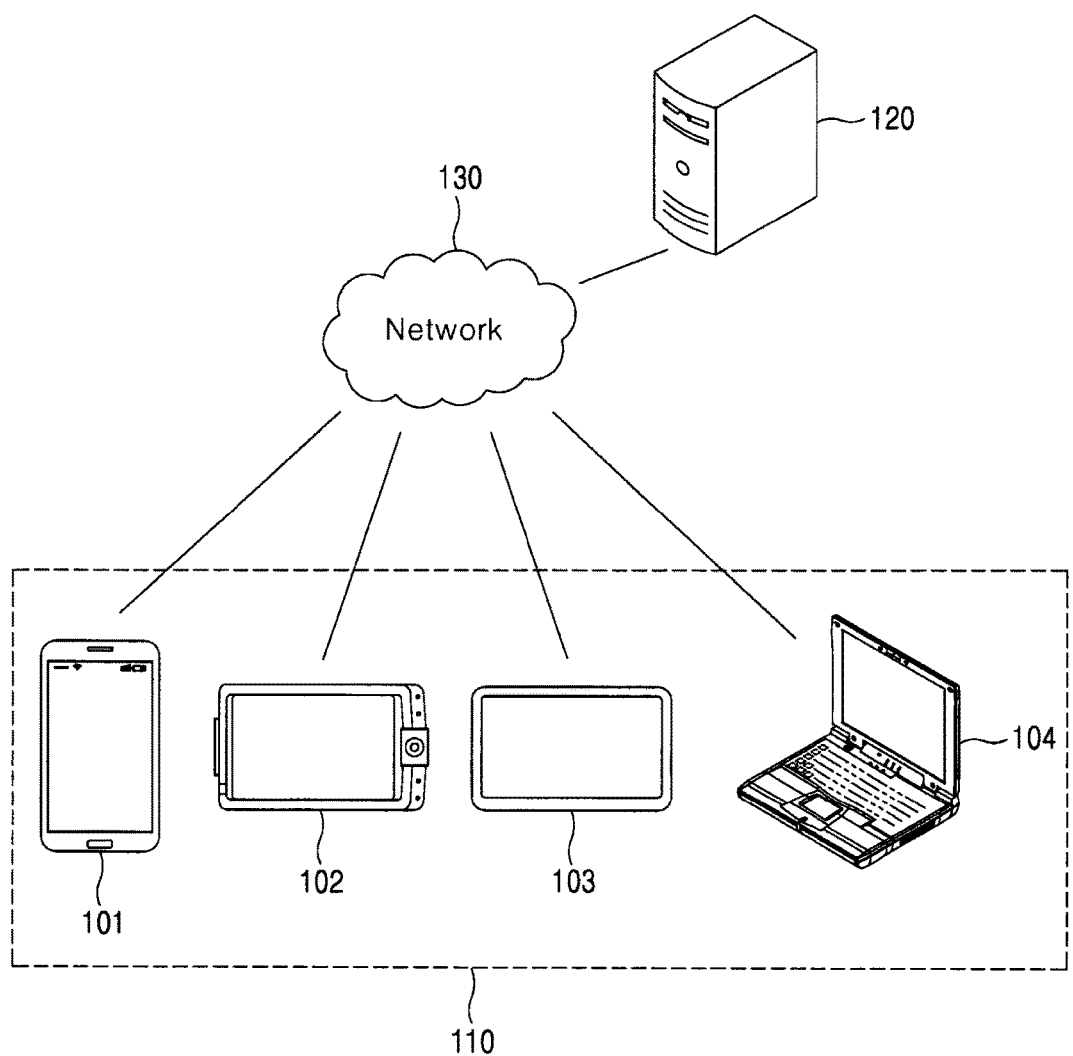
FIG. 1 is a diagram illustrating an example of a network environment according to one embodiment.

Hereinafter, example embodiments are described with reference to the accompanying drawings.

Example embodiments relate to technology for measuring a location, that is, positioning, of a user terminal in conjunction with an indoor area and an outdoor area, and more particularly, to an integrated positioning providing method and system that measure the location of a user terminal moving inside and outside a building based on GPS coordinate information mapped to each of an outdoor area within each building constituting a building complex and an outdoor area around each building and GPS coordinate information of the user terminal. The example embodiments are described based on an example in which an indoor positioning and an outdoor positioning interact based on GPS coordinate information. However, it is provided as an example only. In the case of performing indoor positioning in an indoor area within a building, a location of the user terminal may be measured using fingerprint (FP)-based indoor positioning.

A daily used positioning service for a specific building may provide a location of a user terminal based on an indoor map of a building, and may further measure and provide a location of the user terminal in a connecting passage between buildings, an outdoor plaza, a rooftop (for example, a sky park), an outdoor facility (for example, an outdoor garden, an outdoor kiosk, an open cafe, etc.) around a building, and the like. In particular, the example embodiments relate to an integrated positioning providing method and system that may further accurately measure and provide a floor on which a user terminal is located based on GPS coordinate information in an outdoor area in which a ceiling of a building is at least partially open, such as outdoor facilities present around a first floor of the building, a sky park, an outdoor plaza, a rooftop parking lot, and the like, or an outdoor area within the building with open walls.

The term "building complex" used herein may refer to a plurality of buildings that use a single official name. For example, a building complex may include "Garden Five", "Icheon LOTTE Premium Outlet", "Paju LOTTE Premium Outlet", "Yeoju Shinsegae Premium Outlet", and the like. Garden Five includes four buildings, for example, Techno, Fashion, Living, and NC department store, however, is represented using a single official name "Garden Five" on a map that includes the four buildings, plazas between the buildings, and the like. Accordingly, Garden Five may correspond to a building complex.

The term "wireless access point (AP)" used herein may refer to a wireless fidelity (WiFi) AP. Information associated with a wireless AP present around a user terminal that is received at the user terminal may include at least one of identification information of an AP, a media access control (MAC) address of the AP, and signal strength. Hereinafter, although the WiFi AP is described as a representative example of the wireless AP, it is provided as an example only. Various types of wireless APs that provide a near field wireless communication service may be used in addition to the wireless AP.

The term "integrated positioning providing system" used herein may refer to a "user terminal" and a "location of the integrated positioning providing system" may refer to a "location of the user terminal". The user terminal may perform integrated positioning in conjunction with an indoor area and an outdoor area. The user terminal may receive, from a server, and store integrated positioning information and map information that is required to use an integrated positioning service in a building in which the user terminal is located. For example, the user terminal may install and execute a dedicated application (hereinafter, referred to as a "service app") that provides an integrated positioning service for a building, and may download map information and integrated positioning information of the building from the server at an initial execution of the service app, and may store the downloaded map information and integrated positioning information in a memory. The user terminal may perform integrated positioning based on the integrated positioning information and the map information stored in the memory and an AP list for each area constituting a building complex, without connecting to the server. In response to updating of at least one of the map information, the integrated positioning information, and the AP list, the user terminal may connect to the server and may download the updated information. Herein, the "AP list" may include identification information of each of APs verifiable for each floor of each building area constituting the building complex and identification information of each of APs verifiable in an outdoor area. The verifiable APs represent valid APs on a corresponding floor of a corresponding building. For example, the verifiable APs may represent APs installed on the corresponding floor.

FIG. 1 is a diagram illustrating an example of a network environment according to one embodiment. Referring to FIG. 1, the network environment includes an integrated positioning providing system 110, a server 120, and a network 130. FIG. 1 is provided as an example only and thus, a number of integrated positioning providing systems or a number of servers is not limited thereto.

In FIG. 1, the integrated positioning providing system 110 may be a fixed terminal or a mobile terminal that is configured as various types of computer devices. For example, the integrated positioning providing system 110 may include a smartphone 101, a mobile phone 102, a tablet personal computer (PC) 103, a notebook 104, a navigation device, a desktop, and the like. The integrated positioning providing system 110 may communicate with the server 120 over the network 130.

The server 120 may be configured as a computer apparatus or a plurality of computer apparatuses that provide instructions, codes, files, contents, services, and the like, through communication with the integrated positioning providing system 110 over the network 130.

For example, the server 120 may provide a file for installing an application to the integrated positioning providing system 110 through the network 130. In this case, the integrated positioning providing system 110 may install the application using the file provided from the server 120. Also, the integrated positioning providing system 110 may access the server 120 under control of at least one program, for example, a browser or the installed application, or an operating system (OS) included in the integrated positioning providing system 110, and may use a service or content provided from the server 120. For example, the integrated positioning providing system 110 may transmit a positioning service request message to the server 120 through the network 130 under control of the installed application. In this case, the server 120 may transmit information corresponding to the positioning service request message to the integrated positioning providing system 110. For example, the server 120 may transmit integrated positioning information and map information associated with a building for which a positioning service is requested to the integrated positioning providing system 110. Here, the map information may include store related information, such as a store name, a phone number, and address information of each of stores that are present on a corresponding floor, and map data associated with arrangements of elevators, escalators, exit doors, toilets, passages, and the like, for each floor of each building constituting a building complex. The integrated positioning information may include at least one of area information used to identify each area, area-by-area global positioning system (GPS) coordinate information, identification (ID) information of a wireless AP, floor information associated with a floor on which the wireless AP is installed, a media access control (MAC) address of the wireless AP, and GPS coordinate information of a point at which the wireless AP is installed. To provide an integrated positioning service for a corresponding building, the map information and the integrated positioning information may be constructed in advance through a process of collecting information while moving inside or around the corresponding building and an outdoor area within the building using a scanning device and a drawing process of constructing a contour or a shape of a building complex based on the collected information, for example, a cloud point image of the building complex, and may be stored and managed in a database of the server. A cloud point image refers to an actual scanned image representing a contour, a shape, and a structure of a building, and may be extracted from scan information in a form of xyz, las, etc., using a floor plan design/production program of the corresponding building.

Figure 2:
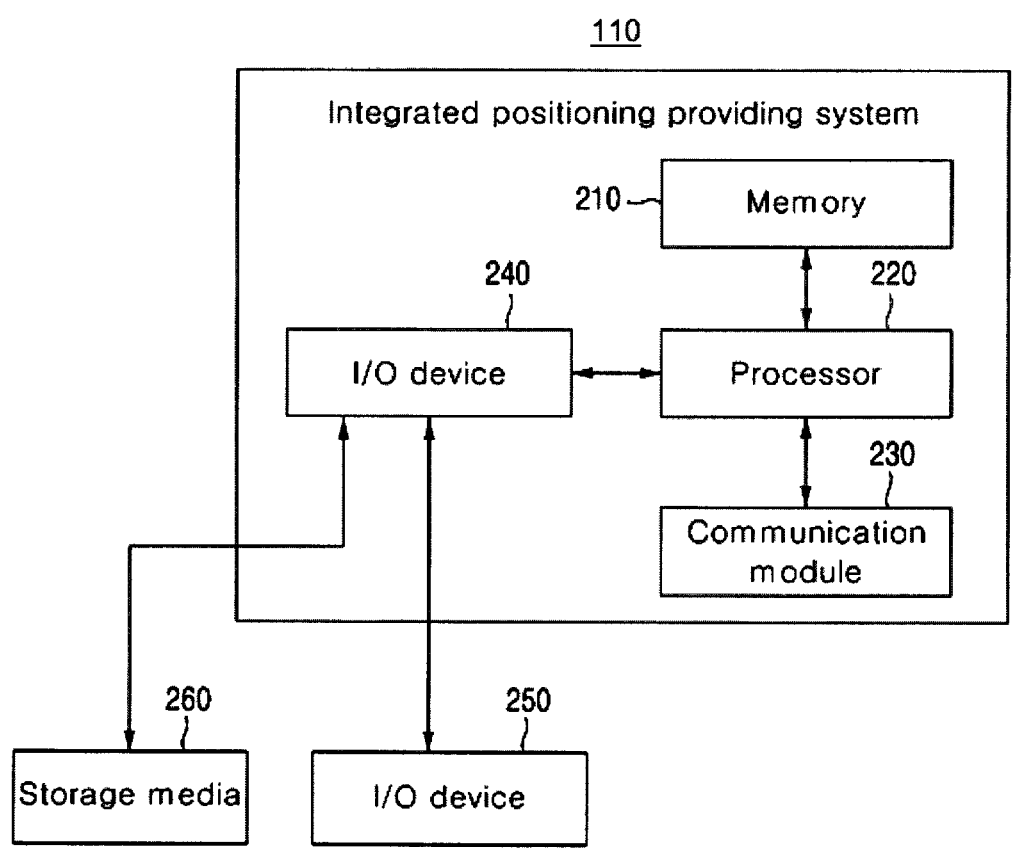
FIG. 2 is a block diagram illustrating a configuration of an integrated positioning providing system according to one embodiment.

FIG. 2 is a block diagram illustrating a configuration of the integrated positioning providing system 110 according to at least one example embodiment.

Referring to FIG. 2, the integrated positioning providing system 110 nay include a memory 210, a processor 220, a communication module 230, an input/output (I/O) interface 240, an I/O device 250, and storage media 260. The memory 210 may include a permanent mass storage device, such as random access memory (RAM), read only memory (ROM), and a disk drive, as a non-transitory computer-readable storage medium. Also, an OS and at least one program code, for example, a code for the application or browser installed and executed on the integrated positioning providing system 110, may be stored in the memory 210. Such software components may be loaded from another non-transitory computer-readable storage medium separate from the memory 210 using a drive mechanism. The other non-transitory computer-readable storage medium may include, for example, a floppy drive, a disk, a tape, a DVD/CD-ROM drive, a memory card, etc. According to other example embodiments, software components may be loaded to the memory 210 through the communication module 230, instead of the non-transitory computer-readable storage medium. For example, at least one program may be loaded to the memory 210 based on a program, for example, the application, installed by files provided over the network 130 from developers or a file distribution system, for example, the server 120, which provides an installation file of the application.

The processor 220 may be configured to process computer-readable instructions of a computer program by performing basic arithmetic operations, logic operations, and I/O operations. The computer-readable instructions may be provided from the memory 210 or the communication module 230 to the processor 220. The processor 220 may be configured to execute received instructions in response to the program code stored in the storage device, such as the memory 210.

The communication module 230 may provide a communication function for mutual communication between the integrated positioning providing system 110 and the server 120 over the network 130 and a communication function for receiving GPS coordinate information of the integrated positioning providing system 110 from a satellite. The communication module 230 may include a wired/wireless communication module configured to provide a wired or wireless communication between the integrated positioning providing system 110 and the server 120 and a GPS module configured to provide a communication with a satellite. A request, for example, an integrated positioning service request, created by the processor 220 in response to a program code stored in a storage device such as the memory 210, may be transferred to the server 120 over the network 130 under control of the communication module 230, and information corresponding to the request may be received from the server 120 through the network 130 and the communication module 230 and be transferred to the memory 210, the processor 220, or the storage media 260.

The I/O interface 240 may be a device used for interface with the I/O device 250 and the storage media 260. An input device of the I/O device 250 may include a device, such as a keyboard, a mouse, a touch pen, a microphone, etc., and an output device of the I/O device 250 may include a device, such as a display, an audio, etc., for displaying a communication session of the application. The I/O interface 240 may be a device for interfacing with an apparatus in which an input function and an output function are integrated into a single function, such as a touch screen. The storage media 260 may include computer-readable recording media, such as a floppy disk, a disk, a tape, a DCV/CD-ROM drive, and a memory card. The processor 220 may store, in the storage media 260, information received from the server 320 for integrated positioning. For example, the storage media 260 may store integrated positioning information, map information, and an AP list for each area constituting a building complex.

Also, according to other example embodiments, the integrated positioning providing system 110 may include a greater or lesser number of components than the number of components shown in FIG. 2. For example, the integrated positioning providing system 110 may include at least a portion of the I/O device 250, or may further include components, for example, a transceiver, a camera, a variety of sensors, and the like.

Figure 3:
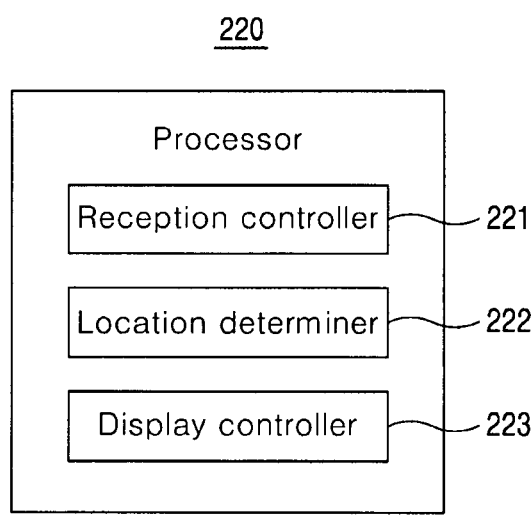
FIG. 3 illustrates an example of components includable in a processor of an integrated positioning providing system according to one embodiment.

FIG. 3 illustrates an example of components or units includable in the processor 220 of the integrated positioning providing system 110 according to one embodiment, and FIG. 4 is a flowchart illustrating an integrated positioning providing method according to one embodiment.

Referring to FIG. 3, the processor 220 of the integrated positioning providing system 110 includes a reception controller 221, a location determiner 222, and a display controller 223. The processor 220 and the components of the processor 220 control the integrated positioning providing system 110 to perform operations 410 through 430 included in the method of FIG. 4 and operations 810 and 820 included in the method of FIG. 8, and configured to operate according to at least one program code and an OS included in the memory 210. The components or units 221, 222, 223 of the processor 220 may be dedicated portions of the processor for performing their respective functions, or they may be representations of different functions performed by the overall processor 220 in response to a control instruction provided from a program code. It is also contemplated that the components or units 221, 222, 223 may implemented as three individual processors performing their respective functions.

The processor 220 may load, to the memory 210, a program code stored in a file of an application for the integrated positioning providing method. For example, the application may be installed in the integrated positioning providing system 110 through a program file. In response to an execution of the installed application, the processor 220 may load the program code to the memory 210. Here, each of the reception controller 221, the location determiner 222, and the display controller 223 included in the processor 220 may be configured to implement operations 410 through 430 of FIG. 4 and operations 810 and 820 of FIG. 8 by executing a portion corresponding to the program code loaded to the memory 210. Hereinafter, that the components of the processor 220 control the integrated positioning providing system 110 may be understood as that the processor 220 controls other components of the integrated positioning providing system 110. For example, the processor 220 may control the communication module 230 and thereby control the integrated positioning providing system 110 so that the integrated positioning providing system 110 may communicate with the server 120 or a satellite (not shown).

FIG. 4 will be described with the assumption that, at an initial execution of the application installed in the integrated positioning providing system 110, the integrated positioning providing system 110 downloads integrated positioning information, map information, and an AP list for each area from the server 120 and stores the same in the storage media 260, and provides integrated positioning of a corresponding building based on the stored integrated positioning information, map information, and AP list for each area.

Referring to FIG. 4, in operation 410, the communication module 230 may establish a communication session for receiving GPS coordinate information of the integrated positioning providing system 110 from the satellite, and the reception controller 221 may control the integrated positioning providing system 110 to receive the GPS coordinate information from the satellite through a communication channel allocated in response to establishing the communication session. Here, the GPS coordinate information may include latitude and longitude.

The reception controller 221 may establish a communication session for receiving wireless AP information from at least one wireless AP present around the integrated positioning providing system 110. For example, the communication module 230 may establish a communication session for receiving wireless AP information from at least one wireless AP present around the integrated positioning providing system 110. The reception controller 221 may control the integrated positioning providing system 110 to receive wireless AP information from at least one wireless AP through a communication channel allocated in response to establishing the communication session. For example, the communication module 230 may establish a communication session for providing a WiFi communication, 3G communication, 3.5G communication, and 4G communication, for example, long term, evolution (LTE) communication, between the integrated positioning providing system 110 and at least one neighboring wireless AP. Here, wireless AP information may include at least one of identification information of a wireless AP, a MAC address of the wireless AP, GPS coordinate information of the wireless AP, and signal strength, for example, a received signal strength indicator (RSSI) value, of the wireless AP.

In operation 420, the location determiner 222 may determine an area in which the integrated positioning providing system 110 is located among an outdoor area around a building constituting a building complex and an indoor area within the building based on the GPS coordinate information of the integrated positioning providing system 110.

For example, the location determiner 222 may determine GPS coordinate information that is mapped to GPS coordinate information of the integrated positioning providing system 110 in the integrated positioning information, and may determine an area corresponding to the determined GPS coordinate information as an area in which the integrated positioning providing system 110 is located. For example, referring to FIG. 5, if GPS coordinate information of the integrated positioning providing system 110 belongs to an area A, the location determiner 222 may determine that the integrated positioning providing system 110 is located in the area A corresponding to an outdoor area within a building of a building A. If GPS coordinate information of the integrated positioning providing system 110 belongs to an area B, the location determiner 222 may determine that the integrated positioning providing system 110 is located in the area B corresponding to are outdoor area within a building of a building B. As another example, if GPS coordinate information of the integrated positioning providing system 110 belongs to an area C, the location determiner 222 may determine that the integrated positioning providing system 110 is located in the area C corresponding to an outdoor area around a building that is a 1F outdoor plaza of a building complex.

In operation 421, the location determiner 222 may verify whether the area in which the integrated positioning providing system 110 is determined to be located is a preset integrated positioning allowed area. For example, a corresponding building or a specific floor of the corresponding building, or a portion of an outdoor area may be preset as an entrance controlled area. Whether an area for each facility constituting a building complex is an integrated positioning allowed area or an integrated positioning disallowed area may be verified from a process of collecting information by scanning a building and surroundings of the building and a drawing process to provide an integrated positioning service. Integrated positioning information stored and managed in a database of the server 120 may include identification information indicating a positioning allowed area, for example, a GPS positioning allowed area, for each area or for each floor of each area. In response to executing the application, the integrated positioning providing system 110 may download the integrated positioning information and the AP list for each area from the server 120 and may store and manage the same in the storage media 260.

Here, an area in which a user terminal is located may be determined among a plurality of buildings constituting a building complex and at least one outdoor area. If the determined area is a positioning disallowed area, the location determiner 222 may determine again the area based on the GPS coordinate information of the integrated positioning providing system 110, may determine again an area in which the integrated positioning providing system 110 is located based on a preset number of pieces of previous location information that is just previously positioned, or may display a message saying "it is a positioning disallowed area" on a display.

If the determined area is a positioning allowed area, the location determiner 222 may determine floor information associated with a floor on which the integrated positioning providing system 110 is located based on the integrated positioning information and the GPS coordinate information of the integrated positioning providing system 110 in operation 422. For example, the location determiner 222 may determine GPS coordinate information corresponding to the GPS coordinate information of the integrated positioning providing system 110 among a plurality of pieces of GPS coordinate information included in the integrated positioning information, and may determine floor information mapped to the determined GPS coordinate information as floor information of the integrated positioning providing system 110. For example, referring to FIG. 5, if GPS coordinate information of the integrated positioning providing system 110 is mapped to GPS coordinate information of the area A, the location determiner 222 may determine that the integrated positioning providing system 110 is located on a fifth floor (5F) of the building A. In FIG. 5, identification information used to identify each area may be pre-stored through mapping to a name of each building or identification information of each building. For example, identification information of the area A may be mapped to a name or identification information of the building A corresponding to the area A. Identification information of the area B may be mapped to a name or identification information of the building B corresponding to the area B.

In operation 430, the display controller 223 may control the integrated positioning providing system 110 to display map information corresponding to the determined floor information on the display, for example, a display screen, of the integrated positioning providing system 110. For example, if the integrated positioning providing system a 110 is determined to be located on 5F (fifth floor) of the building A among a plurality of buildings constituting a building complex, the display controller 223 may display map information corresponding to the 5F of the building A on the display. Here, if the 5F is a sky park or a rooftop corresponding to an outdoor area within a building, the display controller 223 may control the integrated positioning providing system 110 to display a map corresponding to the sky park or the rooftop on the display.

The display controller 223 may control the integrated positioning providing system 110 to display at least one of the determined floor information, for example, a string indicating the 5F, a corresponding area, and the building complex on the map that is displayed on the display. Here, the display controller 223 may control the integrated positioning providing system 110 to provide display information indicating a current location of the integrated positioning providing system 110 at a point corresponding to the GPS coordinate information of the integrated positioning providing system 110 on a map of the determined floor.

If the integrated positioning providing system 110 is determined to be located on a second floor (2F) of the building A that is an indoor area within a building based on FP-based indoor positioning and the 2F is a floor classified as a furniture store, the display controller 223 may control the integrated positioning providing system 110 to display, on the display, a map that includes each furniture store, a toilet, an emergency staircase, an elevator, an escalator, etc., which are present on the 2F.

FIG. 5 illustrates an example of integrated positioning information used to determine an area and floor information based on GPS coordinate information according to at least one example embodiment.

FIG. 5 illustrates an example in which positioning is allowed, that is, possible. However, if a positioning disallowed area is present, information regarding whether a corresponding area is a positioning allowed area may include "disallowed".

Referring to FIG. 5, integrated positioning information 500 may include at least one of area information 501 used to identify each area, area-by-area GPS coordinate information 502, floor information 503 associated with a floor on which a wireless AP is installed, identification information 504 of the wireless AP, a MAC address 505 of the wireless AP, GPS coordinate information 506 of a point at which the wireless AP is installed, and information 507 regarding whether positioning is allowed. The integrated positioning information 500 may be stored in the storage media 260. In the case of providing integrated positioning by executing an application, the integrated positioning providing system 110 may determine an area in which the integrated positioning providing system 110 is located and floor information by referring to the storage media 260.

Figure 6:
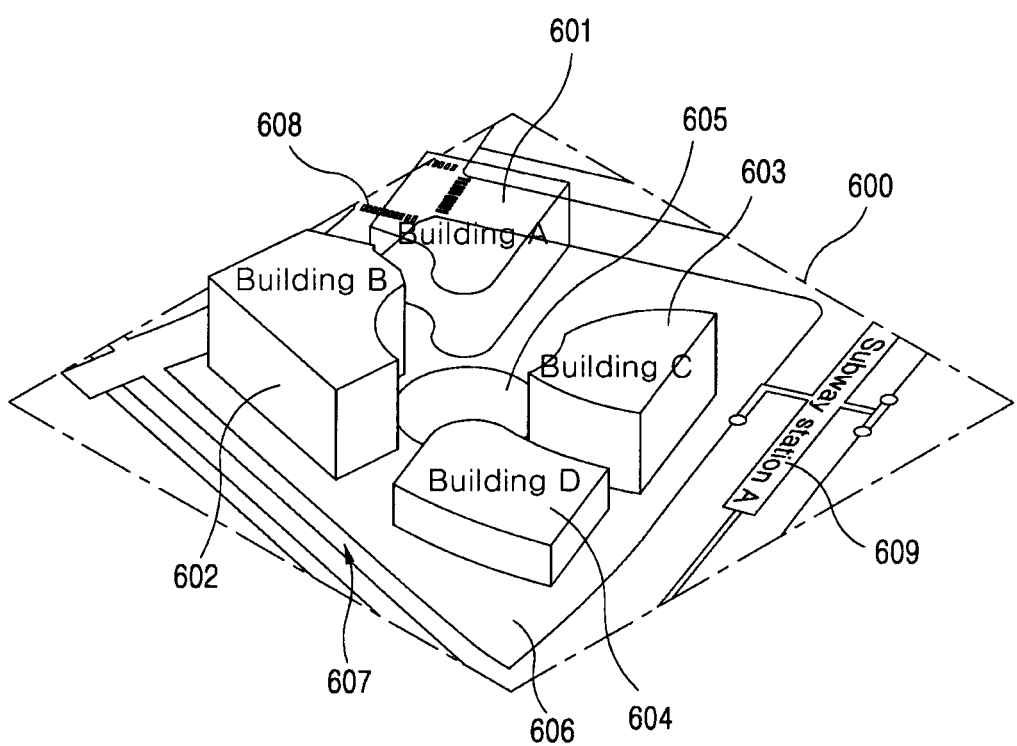
FIG. 6 illustrates an example for describing an operation of determining an area in which an integrated positioning providing system is located among areas constituting a building complex according to one embodiment.
Figure 7:
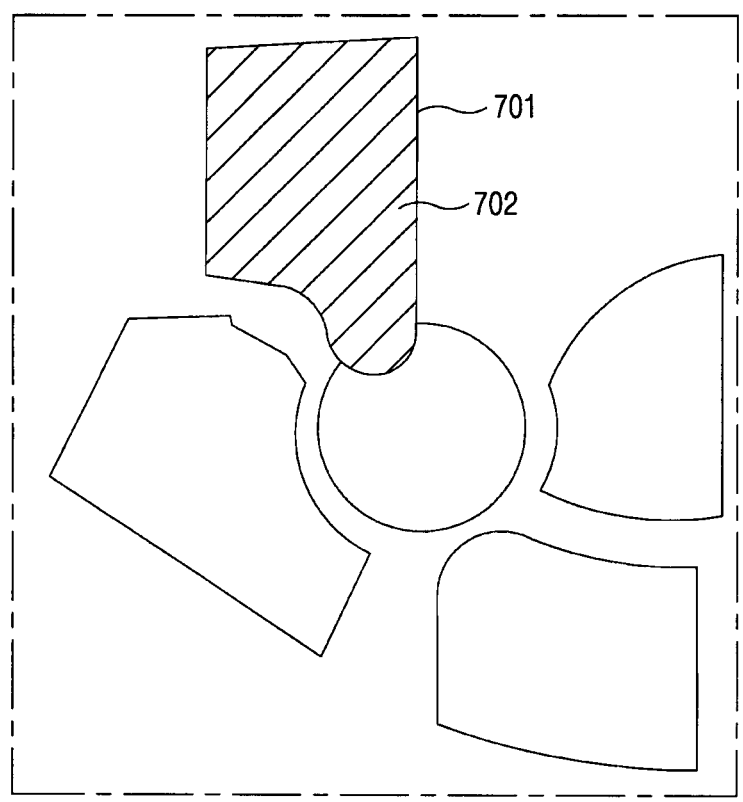
FIG. 7 illustrates a shape of each building constituting a building complex shown FIG. 6 according to one embodiment.

FIG. 6 illustrates an example for describing an operation of determining an area in which an integrated positioning providing system 110 is located among areas constituting a building complex according to one embodiment, and FIG. 7 illustrates a shape of each building constituting the building complex according to one embodiment.

Referring to FIG. 6, a building complex 600, such as Garden Five Paju LOTTE Premium Outlet, etc., may include a plurality of buildings and outdoor areas between the plurality of buildings, such as an outdoor plaza, a fountain, a parking lot, a playground for kids, etc. A floor height of each building may be different. For example, a building complex 600 may include four indoor areas corresponding to a building A 601, a building B 602, a building C 603, and a building D 604, a 1F outdoor plaza 605 between the buildings, and an outdoor area 606 around a building that includes a landscape architecture, and a within-building indoor area that is formed in each building. For example, if a rooftop parking lot is present on a rooftop of the building A 601 and a sky park is present on a third floor (3F) of the building B 602, outdoor areas within the buildings may include the rooftop parking lot present on the 5F of the building A 601 and the sky park present on the 3F of the building B 602. Integrated positioning information of the building complex 600 may be classified into an area A (5F rooftop parking lot of building A 601), an area B (3F sky park of building B 602), and an area C (outdoor area around building). Identification information of each area may be mapped to GPS coordinate information corresponding to a surface area, for example, a polygon, of each classified area and thereby stored in the database of the server 120.

Here, an outdoor area within a building and an outdoor area (for example, the areas A, B, and C) around the building corresponding to each of the building A through the building D may be predetermined during a process of collecting information for integrated positioning information based on outline information of each building and a drawing process, and may be constructed in advance in the database of the server 120. For example, during a process of collecting information while moving inside the building A 601 using a scanning device, an outline area of the building A may be known based on outline walls that form the building A. Referring to FIG. 7, outline information 701 indicating a contour, that is, a shape, of the building A may be generated during a drawing process of generating a map for integrated positioning. Using the same method, outline information 701 indicating each of a contour of the building B, a contour of the building C, and a contour of the building D may be generated during a drawing process of each building. That is, outline information of each building may include surface area (polygon) information of a corresponding building, and corresponding GPS coordinate information within a surface area of the corresponding building may be mapped to the corresponding building. For example, outline information 701 of the building A may include information about a surface area 702 of an area A corresponding to the 5F rooftop parking lot that is a within-building outdoor area of the building A, and GPS coordinate information included in the surface area 702 of the area A may be mapped to identification information of the building A. In this case, the location determiner 222 may receive integrated positioning information from the server 120 and may store and maintain the integrated positioning information in the storage media 260, and may measure a location of the integrated positioning providing system 110 in the building complex 600 by referring to the storage media 260.

The outdoor area 606 around the building refers to an area that is marked as a building complex 600 on a map associated with the building complex 600, and may represent a 1F outdoor area that is distinguished by a boundary between a range to which the building complex 600 belongs and a public facility (e.g., a state land/public land) such as roads 607, a subway station 609, a crosswalk 608, and a park, and a boundary between the building complex 600 and another building complex (not shown) adjacent to the building complex or another isolate building (e.g., a single building).

Figure 8:
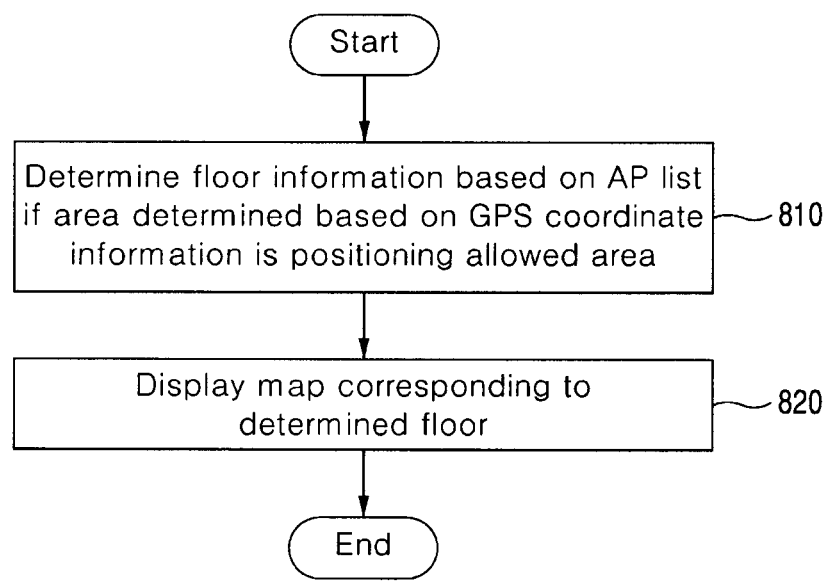
FIG. 8 is a flowchart illustrating an operation of determining floor information based on GPS coordinate information and an access point (AP) list according to one embodiment.

FIG. 8 is a flowchart illustrating an operation of determining floor information based on GPS coordinate information and an AP list according to one embodiment.

An operation of determining floor information based on an AP list, that is, an operation of determining floor information after operation 421 of FIG. 4, that is, after determining that the determined area is an integrated positioning allowed area based on GPS coordinate information, will be described with reference to FIG. 8.

Referring to FIG. 8, in operation 810, once the area in which the integrated positioning providing system 110 is determined to be located among areas constituting a building complex is verified as an integrated positioning allowed area (that is, a GPS positioning allowed area) based on GPS coordinate information of the integrated positioning providing system 110, the location determiner 222 may determine floor information associated with a floor on which the integrated positioning providing system 110 is located based on a wireless AP list (also, referred to as an AP list) stored in the storage media 260.

For example, referring again to FIG. 6, if the integrated positioning providing system 110 is determined to be located in the area C (1F outdoor area) among areas constituting the building complex 600 and the area C is verified as the integrated positioning allowed area, the location determiner 222 may determine floor information associated with a floor on which the integrated positioning providing system 110 is located based on an AP list associated with the determined area and wireless AP information received at the integrated positioning providing system 110.

The AP list may include identification information of a wireless AP and may also include GPS coordinate information or a MAC address of the wireless AP in addition to the identification information of the wireless AP. The location determiner 222 may determine a wireless AP that is mapped to GPS coordinate information or the MAC address from the AP list and may determine floor information corresponding to the determined wireless AP as floor information associated with a floor on which the integrated positioning providing system 110 is currently located. In addition, the location determiner 222 may determine the floor information by combining at least two of the identification information, the GPS coordinate information, and the MAC address.

For example, if the integrated positioning providing system 110 receives wireless AP information of AP13 and AP14, the location determiner 222 may determine a floor that is mapped to identification information of AP13 and AP14 as floor information of the integrated positioning providing system 110 among AP identification information included in an AP list 510 of FIG. 5 associated with the area C. That is, the location determiner 222 may determine a 1F that is an outdoor area of a building complex corresponding to the area C as floor information of the integrated positioning providing system 110. In operation 820, the display controller 223 may display a map corresponding to the determined floor. For example, the display controller 223 may display an outdoor map around the building complex corresponding to the 1F that is the outdoor area, on the display of the integrated positioning providing system 110. Here, the display controller 223 may display a point corresponding to GPS coordinate information of the integrated positioning providing system 110 on the 1F outdoor map using display information indicating, a current location of the integrated positioning providing system 110. For example, the display controller 223 may display my location on the map.

As another example, if the integrated positioning providing system 110 is determined to be located in the area A and the integrated positioning providing system 110 receives wireless AP information of AP13 and AP14, the location determiner 222 may verify that AP13 and AP14 are absent in an AP list 520 associated with the area A and the location determiner 222 may determine floor information of the integrated positioning providing system 110 based on previous location information and altitude information of the integrated positioning providing system 110 that is previously positioned. For example, the area A may be an outdoor area within the building A as the rooftop parking lot provided on the 5F of the building A. In this example, if no AP is installed on the rooftop parking lot, the AP list 520 associated with the area A may not include any AP and may include "none" or "null" value. An operation of determining floor information based on the AP list will be further described with reference to FIG. 9.

Figure 9:
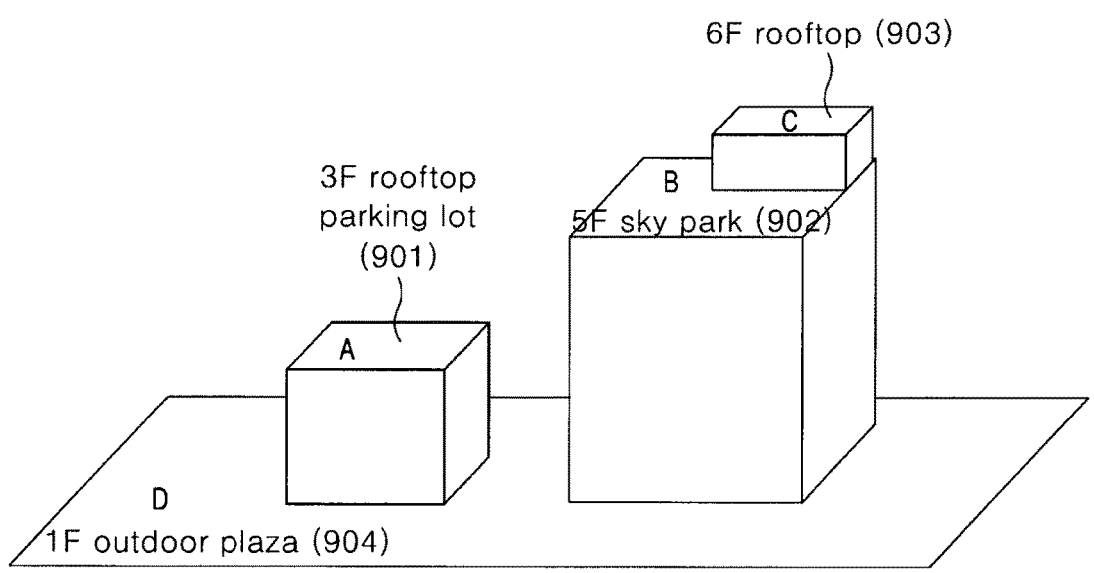
FIG. 9 illustrates an example of describing an operation of determining floor information based on previous location information and altitude information according to one embodiment.

FIG. 9 illustrates an operation of determining floor information based on previous location information and altitude information according to at least one example embodiment.

Referring to FIG. 9, the location determiner 222 may determine floor information associated with a floor on which the integrated positioning providing system 110 is currently located based on previous location information, altitude information (that is, previous altitude information) corresponding to a previous location, and altitude information (that is, current altitude information) corresponding to a current location of the integrated positioning providing system 110, and may determine a location of the integrated positioning providing system 110 on the corresponding floor. Here, the previous location information may be determined based on GPS coordinate information or AP information or may be determined based on a combination thereof. In addition, regardless of the previously positioned location information, the location determiner 222 may determine a current location of the integrated positioning providing system 110 based on the altitude information and the GPS coordinate information or the altitude information and the AP information.

Referring to FIG. 9, a building complex may include a building A configured as three floors, a building B configured as six floors, and a 1F (first floor) outdoor plaza, and may be classified into an area A 901 (a 3F (third floor) rooftop parking lot of the building A) corresponding to an outdoor area within the building A, an area B 902 representing a 5F (fifth floor) sky park of the building B and corresponding to a first outdoor area within the building B, an area C 903 representing a 6F (sixth floor) rooftop of the building B and corresponding to a second outdoor area within the building B, and an area D 904 representing the 1F outdoor plaza and corresponding to an outdoor area around the building complex.

Here, if the integrated positioning providing system 110 is determined to be located on the 5F sky park of the building B and thereby located in the area B 902, APs corresponding to wireless AP information received at the integrated positioning providing system 110 may be verified to be absent from an AP list associated with the area B 902 since no AP is installed on the SF sky park. In this example, the location determiner 222 may determine floor information of the integrated positioning providing system 110 based on previous location information and altitude information of the integrated positioning providing system 110 that are previously positioned. That is, the location determiner 222 may determine floor information of the integrated positioning providing system 110 based on previous location information that is determined based on GPS coordinate information or AP information, altitude information corresponding to a previous location, and altitude information corresponding to a current location.

Here, the altitude information may be sensed at an atmospheric pressure sensor (not shown) installed in the integrated positioning providing system 110. For example, the atmospheric pressure sensor may sense a change in altitude in response to a movement of the integrated positioning providing system 110 based on a sea level and may transmit the generated altitude information to the processor 220. The processor 220 may determine floor information of the integrated positioning providing system 110 based on the altitude information.

For example, if a previously measured location of the integrated positioning providing system 110 is a 6F of the building B, altitude information corresponding to the previously measured location is 62 (e.g., 62 feet), and altitude information corresponding to the currently measured location is 50, the location determiner 222 may calculate an altitude change value of 12 that is a difference between the altitude information corresponding to the previous location and the altitude information corresponding to the current location. The location determiner 222 may compare the altitude change value of 12 and a preset reference altitude value of 10 and may determine that the integrated positioning providing system 110 have moved between floors if the calculated altitude change value of 12 is greater than or equal the reference altitude value of 10. Here, the reference altitude value may be preset based on an inter-floor height of each area. Here, if an altitude value included in altitude information of the current location is greater than an altitude value included in altitude information of a previous location, the location determiner 222 may determine that the integrated positioning providing system 110 has moved upstairs and otherwise, may determine that the integrated positioning providing system 110 has moved downstairs. For example, if the previously measured location is the 6F of the building B, the integrated positioning providing system 110 is determined to have moved between floors based on the altitude change value and the reference altitude value, and current altitude information is less than previous altitude information since the previous altitude information is 62 and the current altitude information is 50, the location determiner 222 may determine that the integrated positioning providing system 110 has moved from the 6F to the 5F sky park of the building B and may determine floor information of the integrated positioning providing system 110 as the 5F. If the previously measured location is the 5F of the building B and current altitude information is greater than previous altitude information, since the previous altitude information is 50 and the current altitude information is 62, the location determiner 222 may determine that the integrated positioning providing system 110 has moved from the 5F to the 6F of the building B.

In this example, the display controller 223 may display a map corresponding to a floor on which the integrated positioning providing system 110 is determined to be currently located, for example, a map corresponding to the 5F sky park on the display of the integrated positioning providing system 110. The display controller 223 may display a current location of the integrated positioning providing system by providing display information at a point corresponding to GPS coordinate information of the integrated positioning providing system 110 on the map. The display controller 223 may further display GPS coordinate information (longitude and latitude) indicating the current location, the name of the building complex to which the building B or the area B 902 belongs, floor string information (e.g., the 5F), floor sequence information, and the like, on the map.

Here, if the integrated positioning providing system 110 moves again from the 5F and the current altitude information is 30, that is, if the previous altitude information is 50 and the current altitude information is 30, the location determiner 222 may determine that the integrated positioning providing system 110 has moved between floors based on the altitude change value of 20 since the reference altitude value is defined in advance as an inter-floor height, and may determine that the integrated positioning providing system 110 has moved downstairs since the current altitude information is less than the previous altitude information. In addition, the location determiner 222 may determine that the integrated positioning providing system 110 has moved downstairs by two floors based on the altitude change value of 20 and the reference altitude value of 10. That is, the location determiner 222 may determine that the integrated positioning providing system 110 has moved from the 5F to the 5F and current floor information corresponds to the 3F. As described above, whether the integrated positioning providing system 110 has moved between floors may be determined based on the altitude change value and the reference altitude value, and the current floor information may be determined based on a level of the determined inter-floor movement.

As another example, if a previously measured location of the integrated positioning providing system 110 is the 5F of the area B 902, altitude information corresponding to the previously measured location is 50 and altitude information corresponding to the currently measured location is 45 and thereby the altitude change value of 5 is less than the reference altitude value of 10, the location determiner 222 may determine that the integrated positioning providing system 110 has not moved between floors. The location determiner 222 may determine current floor information of the integrated positioning providing system 110 as the 5F that is floor information corresponding to the previously measured location.

As another example, floor information associated with a floor on which the integrated positioning providing system 110 is currently located may be determined based on GPS coordinate information and altitude information, regardless of previous location information. Altitude information of a 1F or a lobby floor of each building may be preset as a specific value, such as 0, 1, 5, 10, etc. The floor information of the integrated positioning providing system 110 may be determined based on a reference altitude value that is preset based on an inter-floor height, current altitude information, and altitude information of a 1F or a lobby floor of a corresponding building. For example, if the current altitude information is 62 and altitude information of the 1F is preset as 5, the location determiner 222 may calculate that the current altitude information of 62 corresponds to the 6F through an operation since the reference altitude value of the corresponding building is 10 and the altitude information of the 1F is 5. That is, sections of 5 to 15 correspond to the 1F, sections of 16 to 26 correspond to the 2F, sections (altitude information) of 27 to 37 correspond to the 3F, sections of 38 to 48 corresponds to the 4F, sections of 49 to 59 correspond to the 5F, and sections of 60 to 70 correspond to the 6F. Accordingly, once the reference altitude value indicating the inter-floor height and an altitude value of the 1F are known, the location determiner 222 may calculate the current floor information. Once the floor information is calculated as the 6F, the 6F rooftop top of the building B may be displayed on the display of the integrated positioning providing system 110 based on the current floor information that is calculated using altitude information and current GPS coordinate information. The display controller 223 may display the current location of the integrated positioning providing system 110 by providing display information at a point corresponding to the current GPS coordinate information on the 6F rooftop map.

If the integrated positioning providing system 110 has moved again and the current altitude information is 12, the location determiner 222 may determine that the integrated positioning providing system 110 has moved from the 6F to the 1F based on the previous altitude information of 62, the current altitude information of 12, and the reference altitude value of 10. That is, since the altitude change value is 50 and the reference altitude value is 10, the integrated positioning providing system 110 may be determined to have moved downstairs by five floors. As described above, the location determiner 222 may calculate the current floor changed in response to an inter-floor movement of the integrated positioning providing system 110 based on the previous altitude information, the current altitude information, and the reference altitude value, and may determine a point at which the integrated positioning providing system 110 is located on the current floor calculated using GPS coordinate information.

In addition to the GPS coordinate information, a current location of the integrated positioning providing system 110 may be determined using AP information and altitude information regardless of previous location information As described above with reference to an example in which the GPS coordinate information and the altitude information are used, the floor information associated with the floor on which the integrated positioning providing system 110 is currently located may be determined based on the reference altitude value, the altitude information of the 1F or the lobby floor of each building, and the current altitude information. For example, if the current altitude information is 19 and the current floor information is determined as the 2F, the current location of the integrated positioning providing system 110 may be determined as a point that is determined based on FP points and AP information received from wireless APs adjacent to the integrated positioning providing system 110 among points included in the 2F of the building B. In this case, the display controller 223 may control display information indicating the current location of the integrated positioning providing system 110 to be displayed at the point that is measured based on the AP information and the FP points on a 2F indoor map of the building B. Even in the case of using the AP information, the location determiner 222 may determine current floor information of the positioning providing system 110 having moved between floors by two or more floors based on the altitude change value and the reference altitude value.

As described above, the integrated positioning providing system 110 may determine the current location of the integrated positioning providing system 110 based on the GPS coordinate information and the altitude information, may determine the current location of the integrated positioning providing system 110 based on the AP information and the altitude information, and may determine the current location of the integrated positioning providing system 110 based on the GPS coordinate information, the AP information, and the altitude information. Since previous location information and altitude information are used, floor information of the integrated positioning providing system 110 may be determined although the integrated positioning providing system 110 is located in an indoor area within a building, located in a 1F outdoor area (e.g., an outdoor plaza) around the building, or moves between a plurality of outdoor areas within the building. Although the integrated positioning providing system 110 is located at a point at which a geo-referencing issue or a GPS error easily occurs, such as an edge between the outdoor area within the building and the outdoor area around the building, the floor information of the integrated positioning providing system 110 may be corrected based on the previous location information and the altitude information.

Figure 10:
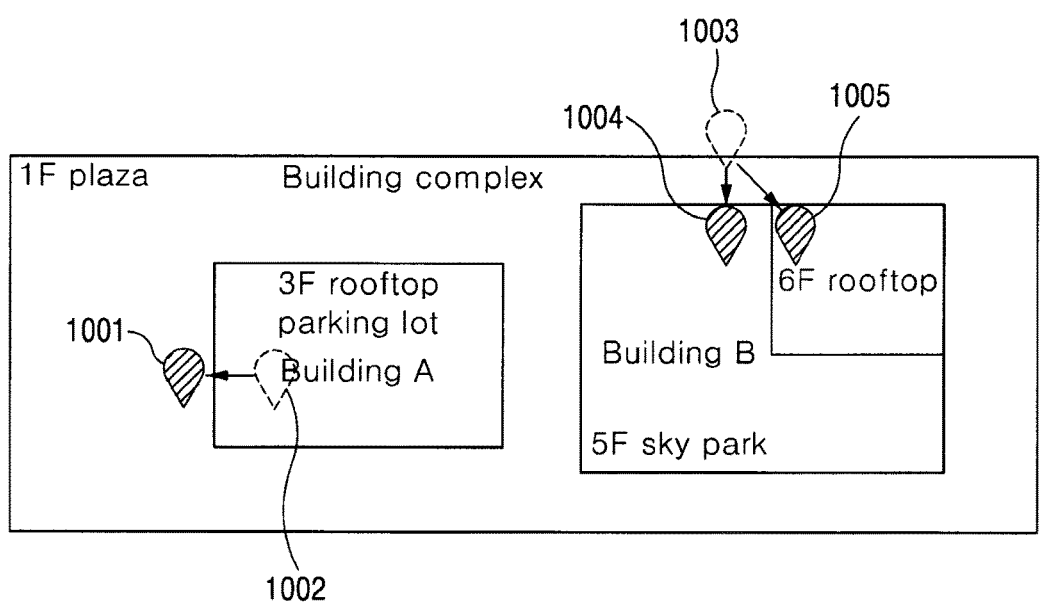
FIG. 10 illustrates an example for describing an operation of correcting a location of an integrated positioning providing system based on previous location information and altitude information according to one embodiment.

FIG. 10 illustrates an example for describing an operation of correcting a location of an integrated positioning providing system 110 based on previous location information and altitude information according to one embodiment.

Referring to FIG. 10, due to a GPS error and a geo-referencing issue, the location of the integrated positioning providing system 110 may be determined to be in the 1F outdoor area around a building A or the 1F outdoor area around a building B although the integrated positioning providing system 110 is substantially located in an outdoor area within a building, such as a 3F rooftop parking lot of the building A or a 5F sky park of the building B.

For example, if the integrated positioning providing system 110 is located on an edge of the 3F rooftop parking lot corresponding to a surface area boundary between the building A and a 1F plaza, an area corresponding to GPS information of the integrated positioning providing system 110 may be determined as an area D, that is, an outdoor area around a building, corresponding to the 1F plaza of the building complex due to a GPS error. Since the 3F rooftop parking lot has an open ceiling, the integrated positioning providing system 110 located on the 3F may receive wireless AP information from APs installed in a convenient store, a café booth, etc., which are located on the 1F. In this case, since an AP list associated with the area D includes APs from which the integrated positioning providing system 110 receives the wireless AP information, floor information of the integrated positioning providing system 110 may be determined as not the 3F that is an actual location 1002 but the 1F. That is, a point 1001 corresponding to the GPS coordinate information in the outdoor area corresponding to the 1F plaza may be determined as a current location of the integrated positioning providing system 110. To solve a positioning error by a GPS error, the location determiner 222 may correct the floor information, that is, the current location of the integrated positioning providing system 110 based on previous location information and altitude information.

For example, if a building and floor information corresponding to previous location information correspond to a 2F of the building A, the previous altitude information is 20, and the current altitude information is 30, the altitude change value of 10 is greater than or equal to the reference altitude value of 10 and the current altitude information is greater than the previous altitude information. Accordingly, the location determiner 222 may determine floor information of the integrated positioning providing system 110 as the 3F of the building A and may match (i.e., map-match) a point corresponding to GPS coordinate information of the integrated positioning providing system 110 to map information corresponding to the 3F of the building A. That is, the current location of the integrated positioning providing system 110 may be corrected from the point 1001 of the 1F to the point 1002 of the 3F.

As another example, although the integrated positioning providing system 110 is currently located on the 1F, a location of the integrated positioning providing system 110 may be measured to be located on the 3F. In this case, an area corresponding to the previously positioned location information is 1F and the altitude change value of, for example, 2, is less than the reference altitude value of 10. Thus, the location determiner 222 may verify that the integrated positioning providing system 110 has not moved between floors. The location determiner 222 may correct the current location from the point 1002 of the 3F to the point 1001 of 1F.

As another example, two outdoor areas, for example, a 5F sky park and a 6F rooftop may be present within the building B and the integrated positioning providing system 110 may move from the 5F sky park to the 6F rooftop or from the 6F rooftop to the 5F sky park through a moving device such as a staircase or an escalator. In the case of moving in an outdoor area, the current location of the integrated positioning providing system 110 may be determined as a 1F point 1003 around the building B due to a geo-referencing issue. In this case, the location determiner 222 may correct the current location based on previous location information and altitude information or previous altitude information and current altitude information. For example, if the integrated positioning providing system 110 is located on the 5F, the current location may be map-matched to a 5F point 1004. If the integrated positioning providing system 110 is located on the 6F, the current location may be map-matched to a 6F point 1005. The display controller 223 may display, on the map, display information indicating the current location that is corrected from the 1F point 1003 to the 5F point 1004 through map-matching to the 5F point 1004.

Figure 11:
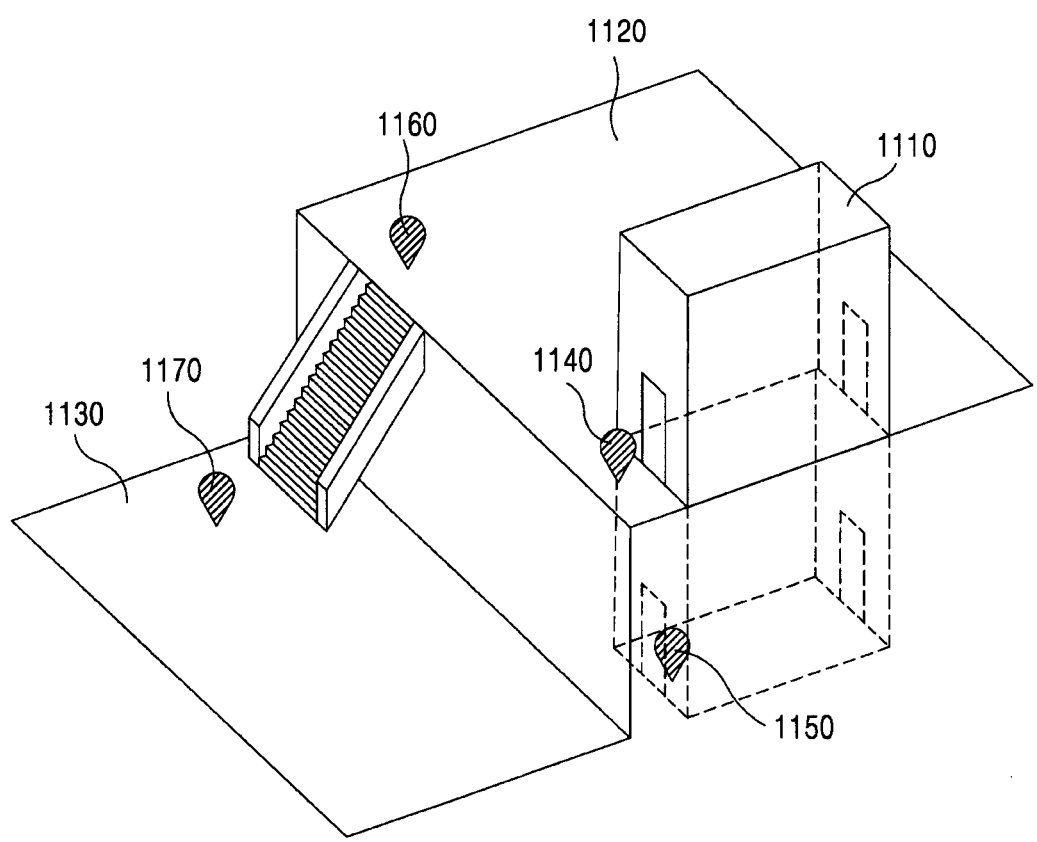
FIG. 11 illustrates an example for describing an operation of providing integrated positioning information in conjunction with an outdoor area and an indoor area according to one embodiment.

FIG. 11 illustrates an example for describing an operation of providing integrated positioning information in conjunction with an outdoor area and an indoor area according to at least one example embodiment.

Referring to FIG. 11, a building complex may include an indoor area 1110 within a building, an outdoor area 1120 within the building, and an outdoor area 1130 around the building. The outdoor area 1120 within the building and the outdoor area 1130 around the building may be connected to be movable from outside the building through a moving device such as a staircase and an escalator. FIG. 11 illustrates an example of the outdoor area 1120 within the building including a single floor and the outdoor area 1130 around the building including a single floor. However, it is provided as an example only. The outdoor area 1120 within the building may include a plurality of floors and the outdoor area 1130 around the building, may also include a plurality of floors.

Referring to FIG. 11, indoor positioning within the building may be performed using FP-based positioning. For example, indoor positioning within the building may be performed based on signal strength of each wireless AP measured at an FP that is a virtual point designated inside the building and signal strength of each wireless AP received at the integrated positioning providing system 110.

Referring to FIG. 11, if the integrated positioning providing system 110 moves from a 1F plaza (the outdoor area 1130) to a 2F plaza (the outdoor area 1120) through a staircase or an inclined sidewalk for movement of bicycles, a baby carriage, a wheelchair, and the like, the location determiner 222 may determine that the integrated positioning providing system 110 is located in the outdoor area 1120 within the building based on GPS coordinate information and may verify whether the determined outdoor area 1120 is a positioning allowed area. For example, if it is the positioning allowed area, the location determiner 222 may determine floor information that is lapped to the outdoor area 1120 corresponding to the GPS coordinate information of the integrated positioning providing system 110 as floor information, for example, the 2F, of the integrated positioning providing system 110. In addition, the location determiner 222 may also determine floor information, for example, the 2F, corresponding to the current location of the integrated positioning providing system 110 based on wireless AP information of each AP received at the integrated positioning providing system 110 and an AP list corresponding to the determined outdoor area 1120. In contrast, although the integrated positioning providing system 110 moves from the 2F to the 1F, the location determiner 222 may verify whether a floor is changed based on altitude information and may determine floor information corresponding to the current location. As described above, although the outdoor area 1120 within the building, such as the 2F plaza, and the outdoor area 1130 around the building, such as the 1F plaza, include a plurality of floors and are connected through a moving device, although the outdoor area 1120 within the building includes a plurality of floors, or although the outdoor area 1130 around the building includes a plurality of floors, a current location of the integrated positioning providing system 110 may be measured by identifying a floor even outdoors.

Here, if the integrated positioning providing system 110 moves from the 2F plaza to an indoor area within a building that is connected to the 2F plaza, the display controller 223 may display a map corresponding to a 2F indoor area of the corresponding building on the display of the integrated positioning providing system 110.

For example, if a point 1140 corresponding to GPS coordinate information of the integrated positioning providing system 110 is included in an area around an exit through which entrance and exit are made between the 2F plaza and the 2F indoor area, or if a previously measured location is an outdoor area corresponding to the 2F plaza and a currently measured location is the 2F indoor area, the display controller 223 may display a 2F indoor map on the display. The display controller 223 may display some outdoor areas around the exit connected to the 2F plaza on the indoor map, and may also provide display information indicating a current location of the integrated positioning providing system 110 in the outdoor area.

As another example, if the integrated positioning providing system 110 moves from a 1F indoor area to a 1F outdoor area connected thereto, the display controller 223 may display a map associated with the 1F plaza. For example, if a point 1150 corresponding to GPS coordinate information of the integrated positioning providing system 110 is included in an area around an exit door within a 1F of the building that is connected from an indoor area of the 1F of the building to the 1F plaza, or if a previously measured location is the indoor area of the 1F of the building and a currently measured location is the outdoor area 1130 corresponding to the 1F plaza, the display controller 223 may display a map associated with the 1F plaza on the display.

As another example, if the integrated positioning providing system 110 moves from the 2F plaza to the 1F plaza through a moving device such as an escalator and a staircase, the display controller 223 may display a map associated with a floor to which the integrated positioning providing system 110 is moving. For example, if a point 1160 corresponding to GPS coordinate information of the integrated positioning providing system 110 is included in a preset area around an escalator of the 2F plaza, the location, determiner 222 may determine that the integrated positioning providing system 110 is present within a 2F-to-1F movable range. In this case, the display controller 223 may display a map corresponding to the 1F plaza on the display of the integrated positioning providing system 110. In contrast, if a point 1170 corresponding to GPS coordinate information of the integrated positioning providing system 110 is included in a preset area around an escalator of the 1F plaza, the display controller 223 may display a map corresponding to the 2F plaza on the display of the integrated positioning providing system 110.

According to example embodiments, when providing integrated positioning in conjunction with an indoor area and an outdoor area, an integrated positioning providing system of a user terminal may determine an area and floor information in which the integrated positioning providing system freely moving indoors and outdoors is located in a building complex based on GPS coordinate information mapped to a surface area (polygon) corresponding to each area constituting the building complex and GPS coordinate information of the integrated positioning providing system in a drawing operation. The floor information may be determined based on an AP list, previous location information, and altitude information, and a current location of the integrated positioning providing system may be further accurately determined in conjunction with an indoor area and an outdoor area by correcting a determined current location.

The apparatuses and components described herein may be implemented using hardware components, software components, and/or a combination thereof. For example, the apparatuses and the components described herein may be implemented using, computers, such as, for example, a processor, a controller, an arithmetic logic unit (ALU), a digital signal processor, a microcomputer, a field programmable gate array (FPGA), a programmable logic unit (PLU), microprocessor, or any other processing device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example a processing device may include multiple processors or a processor and a controller. In addition, different processing configurations are possible, such as parallel processors.

Software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The computer-readable media may also include, alone or in combination with the program instructions, data files, data structures, and the like. The program instructions recorded on the computer-readable media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of providing a position of a user terminal, comprising:
   receiving, by a processor, global positioning system (GPS) coordinate information of the user terminal that moves in an outdoor area around a building and an outdoor area within the building; and
   determining, by the processor, an area in which the user terminal is located in the building and floor information associated with a floor on which the user terminal is located in the building based on GPS coordinate information mapped to each of the outdoor area around the building and the outdoor area within the building and the received GPS coordinate information.

2. The method of claim 1, wherein the GPS coordinate information mapped to each of the outdoor area around the building and the outdoor area within the building comprises GPS coordinate information corresponding to identification information of each building constituting a building complex and a surface area of an outdoor area around each building and GPS coordinate information corresponding to a surface area of an outdoor area within each building in response to the building being the building complex including a plurality of buildings.

3. The method of claim 1, wherein the receiving of the GPS coordinate information comprises receiving wireless access point (AP) information of a wireless AP adjacent to the user terminal, and
   the determining of the area and the floor information comprises verifying whether a wireless AP corresponding to the received wireless AP information is present among wireless APs included in an AP list associated with the determined area, and determining the floor information associated with the floor on which the user terminal is located among at least one piece of floor information that belongs to the determined area.

4. The method of claim 1, wherein the determining of the area and the floor information comprises correcting the floor information of the user terminal based on floor information and altitude information corresponding to a previous location of the user terminal.

5. The method of claim 1, further comprising:
   receiving, and storing, by the processor, integrated positioning information associated with the building sent from a server over a network,
   wherein the integrated positioning information is classified for each area constituting the building, and comprises at least one of area information, area-by-area GPS coordinate information, floor information associated with a floor on which a wireless AP is installed, identification information of the wireless AP, a media access control (MAC) address of the wireless AP, GPS coordinate information of a point at which the wireless AP is installed, and positioning allowed identification information.

6. The method of claim 5, wherein the determining of the area and the floor information comprises determining floor information corresponding to identification information of a verified wireless AP as floor information of the user terminal in response to verifying a presence of the wireless AP corresponding to the received wireless AP information from an AP list associated with the determined area.

7. The method of claim 1, wherein the determining of the area and the floor information comprises determining floor information of the user terminal based on floor information and altitude information corresponding to a previous location of the user terminal in response to verifying an absence of a wireless AP corresponding to the received wireless AP information from an AP list associated with the determined area.

8. The method of claim 1, further comprising:
   displaying, by the processor, a map corresponding to an indoor area in response to the user terminal located in the outdoor area within the building moving to the indoor area within the building connected to the outdoor area; and
   displaying, by the processor, a map corresponding to the outdoor area in response to the user terminal moving from an indoor area connected to the outdoor area within the building to the outdoor area.

9. The method of claim 1, wherein the determining of the area and the floor information comprises verifying, by the processor, whether the determined area in which the user terminal is located corresponds to a preset integrated positioning allowed area.

10. The method of claim 1, wherein the determining of the area and the floor information comprises determining a location of the user terminal according to a movement between a plurality of floors in the outdoor area within the building.

11. An integrated positioning providing system of a user terminal configured as a computer, the integrated positioning providing system comprising:
- at least one processor configured to execute computer-readable instructions,
- wherein the at least one processor comprises:
- a reception controller configured to control the user terminal to receive global positioning system (GPS) coordinate information of the user terminal that moves in an outdoor area around a building and an outdoor area within the building; and
- a location determiner configured to control the user terminal to determine an area in which the user terminal is located in the building and floor information associated with a floor on which the user terminal is located in the building based on GPS coordinate information mapped to each of the outdoor area around the building and the outdoor area within the building and the received GPS coordinate information.

12. The integrated positioning providing system of claim 11, wherein the GPS coordinate information mapped to each of the outdoor area around the building and the outdoor area within the building comprises GPS coordinate information corresponding to identification information of each building constituting a building complex and a surface area of an outdoor area around each building and GPS coordinate information corresponding to a surface area of an outdoor area within each building in response to the building being the building complex including a plurality of buildings.

13. The integrated positioning providing system of claim 11, wherein the reception controller is configured to receive wireless access point (AP) information of a wireless AP adjacent to the user terminal, and
- the location determiner is configured to verify whether a wireless AP corresponding to the received wireless AP information is present among wireless APs included in an AP list associated with the determined area, and to determine the floor information associated with the floor on which the user terminal is located among at least one piece of floor information that belongs to the determined area.

14. The integrated positioning providing system of claim 11, wherein the location determiner is configured to correct the floor information of the user terminal based on floor information and altitude information corresponding to a previous location of the user terminal.

15. The integrated positioning providing system of claim 11, wherein the location determiner is configured to determine floor information corresponding to identification information of a verified wireless AP as floor information of the user terminal in response to verifying a presence of the wireless AP corresponding to the received wireless AP information from an AP list associated with the determined area.

16. The integrated positioning providing system of claim 11, wherein the location determiner is configured to determine floor information of the user terminal based on floor information and altitude information corresponding to a previous location of the user terminal in response to verifying an absence of a wireless AP corresponding to the received wireless AP information from an AP list associated with the determined area.

17. The integrated positioning providing system of claim 11, further comprising:
- a display controller configured to control the user terminal to display a map corresponding to an indoor area on a display of the user terminal in response to the user terminal located in the outdoor area within the building moving to the indoor area within the building connected to the outdoor area, and to control the user terminal to display a map corresponding to the outdoor area on the display of the user terminal in response to the user terminal moving from an indoor area connected to the outdoor area within the building to the outdoor area.

18. The integrated positioning providing system of claim 11, wherein the location determiner is configured to control the user terminal to verify whether the determined area in which the user terminal is located corresponds to a preset integrated positioning allowed area.

19. The integrated positioning providing system of claim 11, wherein the location determiner is configured to determine a location of the user terminal according to a movement between a plurality of floors in the outdoor area within the building.

20. A non-transitory computer-readable storage medium storing a program for providing a location of a user terminal, wherein the program instructs a processor to perform the steps comprising;
- receiving global positioning system (GPS) coordinate information of the user terminal that moves in an outdoor area around a building and an outdoor area within the building; and
- determining an area in which the user terminal is located in the building and floor information associated with a floor on which the user terminal is located in the building based on GPS coordinate information mapped to each of the outdoor area around the building and the outdoor area within the building and the received GPS coordinate information.

* * * * *